United States Patent [19]
Kawase et al.

[11] Patent Number: 5,349,735
[45] Date of Patent: Sep. 27, 1994

[54] INFORMATION DETECTION APPARATUS AND DISPLACEMENT INFORMATION MEASUREMENT APPARATUS

[75] Inventors: Toshimitsu Kawase, Atsugi; Akihiko Yamano, Yokohama; Ryo Kuroda, Atsugi; Hiroyasu Nose, Zama; Toshihiko Miyazaki, Hiratsuka, all of Japan

[73] Assignee: Canon Kabushiki Kaisha, Tokyo, Japan

[21] Appl. No.: 132,161

[22] Filed: Oct. 5, 1993

Related U.S. Application Data

[63] Continuation of Ser. No. 727,529, Jul. 9, 1991, abandoned.

[30] Foreign Application Priority Data

Jul. 9, 1990 [JP] Japan .................................. 2-179558

[51] Int. Cl.⁵ ............................................. H01J 37/00
[52] U.S. Cl. ...................................... 29/407; 250/306; 369/126
[58] Field of Search ............... 250/306, 307; 365/151; 369/126; 29/407

[56] References Cited

U.S. PATENT DOCUMENTS

| | | | |
|---|---|---|---|
| 4,343,993 | 8/1982 | Binnig et al. | 250/306 |
| 4,924,091 | 5/1990 | Hansma et al. | 250/306 |
| 4,945,515 | 7/1990 | Ooumi et al. | 365/174 |
| 4,987,303 | 1/1991 | Takase et al. | 250/306 |
| 5,047,633 | 9/1991 | Finlan et al. | 250/306 |

FOREIGN PATENT DOCUMENTS

| | | |
|---|---|---|
| 0027517 | 4/1981 | European Pat. Off. . |
| 0272935 | 6/1988 | European Pat. Off. . |
| 0304893 | 1/1989 | European Pat. Off. . |
| 0361932 | 4/1990 | European Pat. Off. . |
| 0363550 | 4/1990 | European Pat. Off. . |
| 0397116 | 11/1990 | European Pat. Off. . |
| 62-209302 | 9/1987 | Japan . |

*Primary Examiner*—Joseph M. Gorski
*Attorney, Agent, or Firm*—Fitzpatrick, Cella, Harper & Scinto

[57] ABSTRACT

An information detection apparatus is disclosed. A plurality of probes are arranged in the apparatus so as to face a medium which carries an information, Each of the plurality of probes produces a detection signal from the medium. A performance testing device is provided in the apparatus for testing the performance of each of the plurality of probes. A detection device in the apparatus selects the signal from at least one normal probe on the basis of the test result of the testing device and detects the information in accordance with the selected signal. By such the construction in the apparatus, the detection of the information can be continuously effected even if one of the probes is broken.

25 Claims, 8 Drawing Sheets

BEFORE APPLICATION OF PULSE VOLTAGE

AFTER APPLICATION OF PULSE VOLTAGE

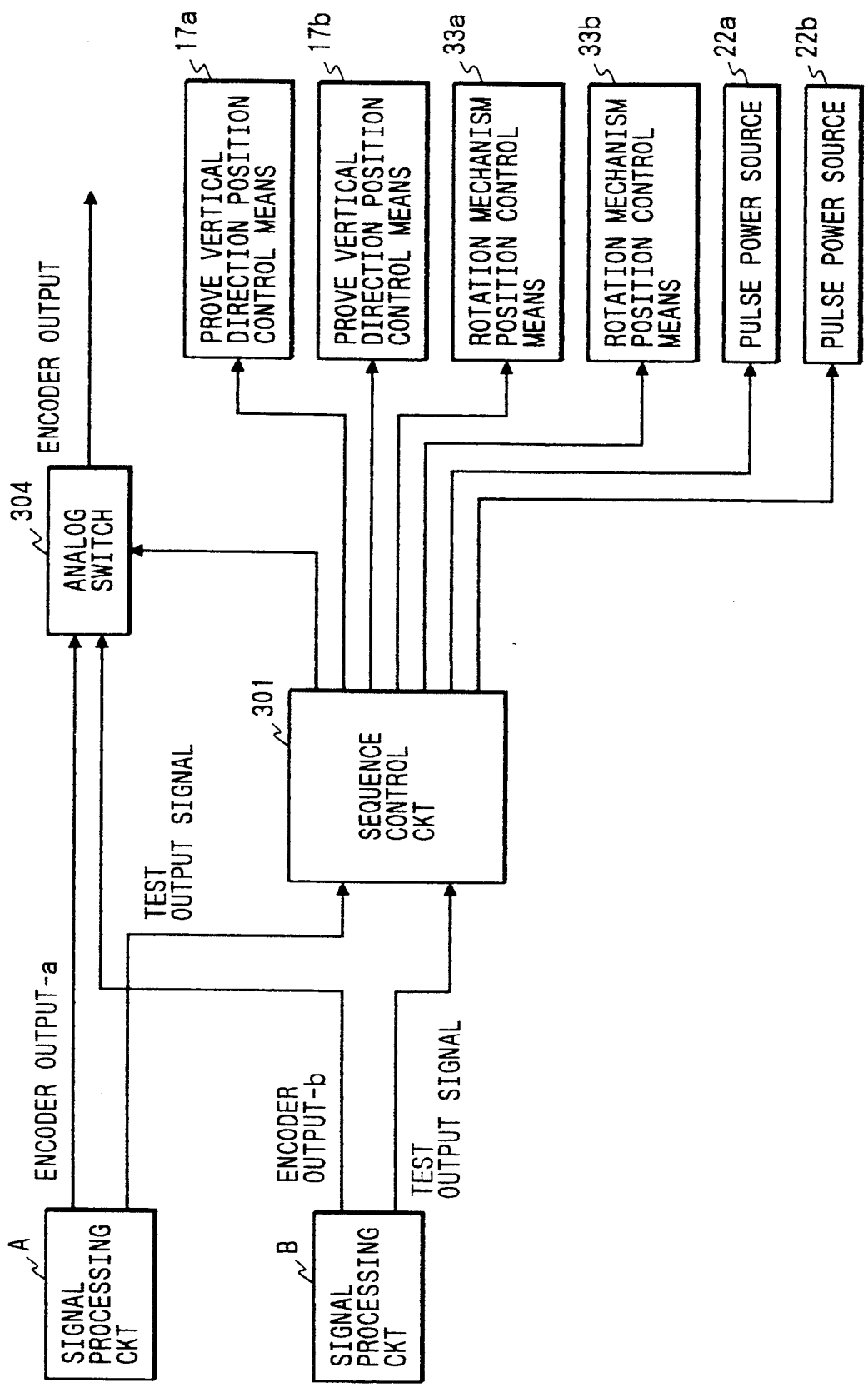

INFORMATION DETECTION APPARATUS AND DISPLACEMENT INFORMATION MEASUREMENT APPARATUS

This application is a continuation of application Ser. No. 07/727,529 filed Jul. 9, 1991, now abandoned.

BACKGROUND OF THE INVENTION

1. Field of the Invention

The present invention relates to an information detection apparatus, and more particularly to an information detection apparatus as represented by an encoder used for a displacement information measurement apparatus in measuring dimension, distance or velocity such as measurement control which needs a resolution power in the order of atom (several Å).

2. Related Background Art

In the past, the encoder of this type comprises a reference scale having information on position or angle, and detection means relatively movable with the reference scale to detect information on position or angle. Such an encoder is classified into several types depending on the reference scale and the detection means, such as an optical encoder, a magnetic encoder and an electrostatic encoder.

As an encoder having a resolution power in the order of atom, a parallel displacement detection apparatus is disclosed in Japanese Laid-Open Patent Application No. 62-209302. It uses a basic principle of a scanning tunneling microscope disclosed in U.S. Pat. No. 4,343,993 which permits the observation of information on a sample surface at the atom resolution power.

In the past, such an encoder comprises a scale which is a reference to length and a probe arranged in the vicinity of the scale. Information derived from a tunneling current which flows between the reference scale having a drive mechanism and the probe is processed and encoded.

The probe which detects the tunneling current of the encoder is usually manufactured by a well-known electrolytic polishing method to form a sharp needle. Alternatively, machine polishing may be used.

However, the function of the probe which has the sharpness in the order of atom to detect the tunneling current is a heart of the encoder and the performance of the probe directly affects the performance of the encoder. In order to control and detect the tunneling current in the order of pA or nA which flows between the reference scale and the probe, it is necessary to set the distance between the reference scale and the probe to a very small distance such as several nm. Thus, when acoustic vibration or floor vibration occurs, the probe may contact the reference scale and the tip end of the probe may be broken so that it may no longer have the atom resolution power and permit the measurement in the order of atom.

SUMMARY OF THE INVENTION

It is a first object of the present invention to provide an information detection apparatus which permits the continued detection of information even if a probe is broken by vibration.

It is a second object of the present invention to provide a displacement information measurement apparatus which permits the measurement of displacement information with a higher stability without being affected by vibration.

The other objects of the present invention will be apparent from the detailed description of the embodiments of the present invention.

BRIEF DESCRIPTION OF THE DRAWINGS

FIG. 7 shows a block diagram of a periphery of a sequence control circuit.

DETAILED DESCRIPTION OF THE PREFERRED EMBODIMENTS

Figure 1:
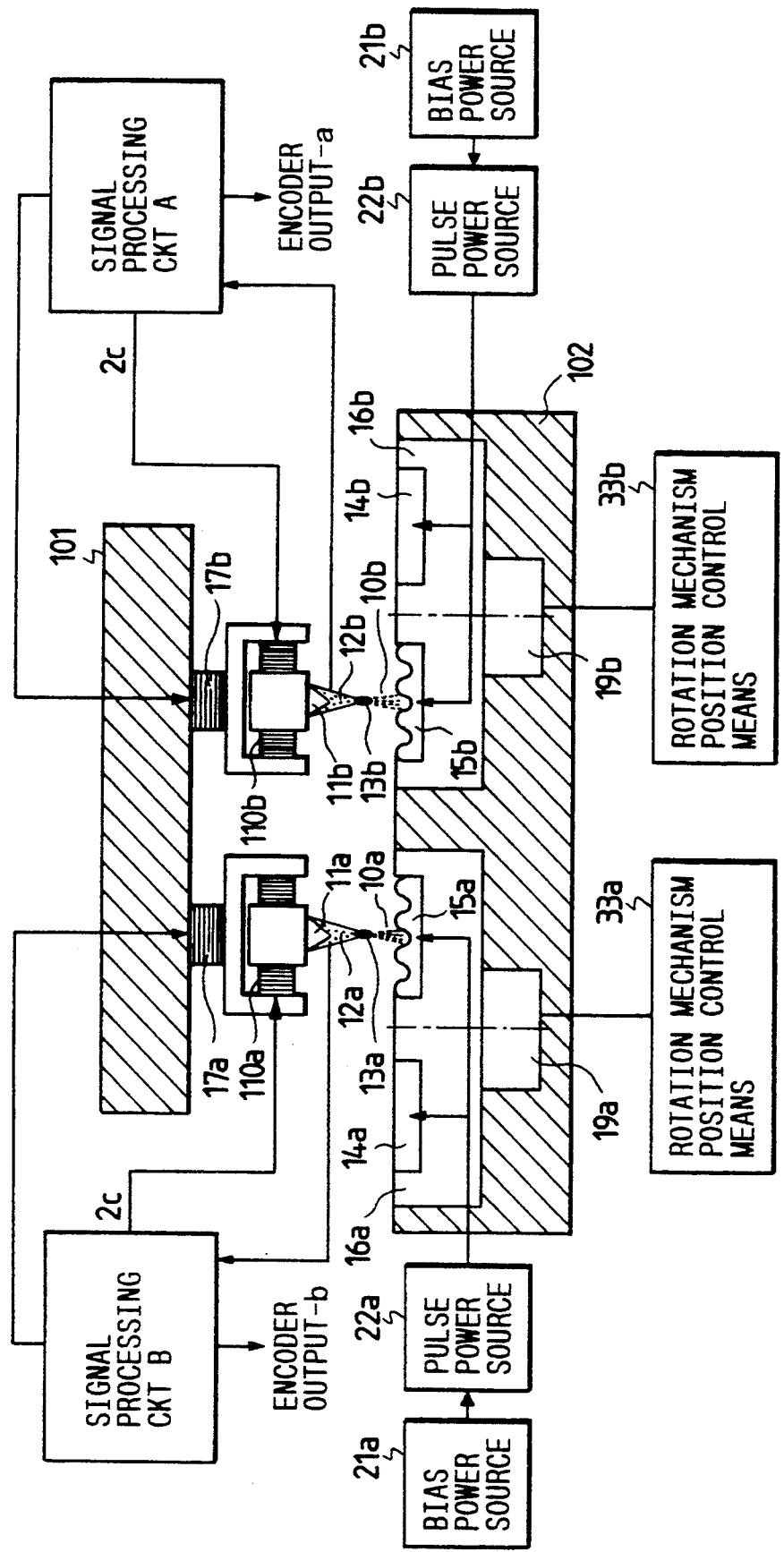
FIG. 1 shows a configuration of an encoder by the detection of a plurality of tunneling currents, in accordance with one embodiment of the present invention.
Figure 2:
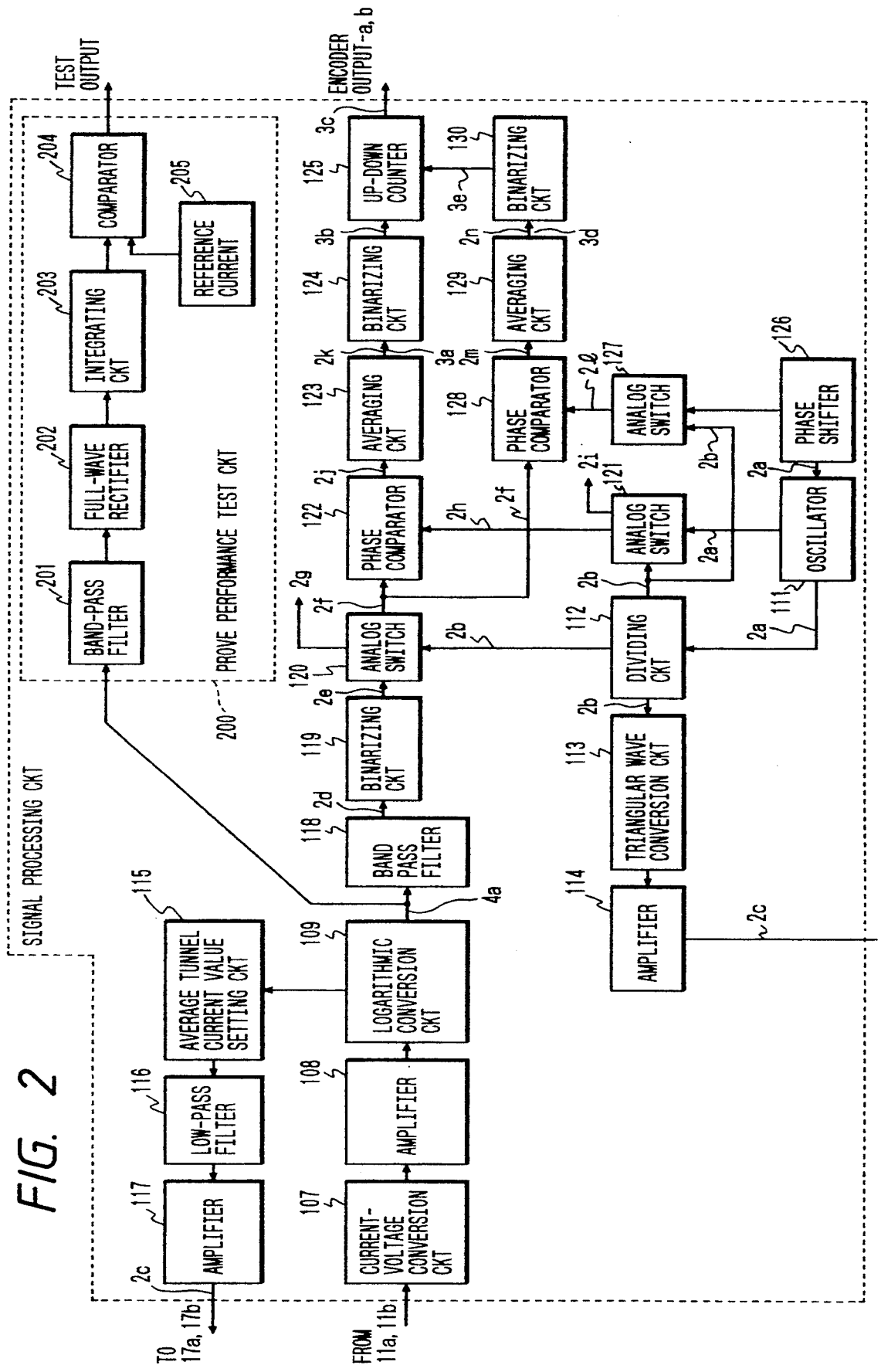
FIG. 2 shows a block diagram of a signal processing circuit in FIG. 1, FIGS. 3, 4 and 5 show waveforms of signals produced in the signal processing circuit.

FIG. 1 shows a configuration of an encoder in one embodiment of the present invention, and FIG. 2 shows a block diagram which is common to a signal processing circuit A and a signal processing circuit B shown in FIG. 1.

In FIG. 1, an object 101 and an object 102 are arranged such that they can relatively move only laterally (left or right on the drawing).

Two probes 11a and 11b are provided for the object 101. Each of the probes 11a and 11b has a probe cover member 12a or 12b and a fine projection 13a or 13b (a method for forming the fine projection will be explained later) on the surface thereof. For the object 102, reference scales 15a and 15b and probe reproducing electrodes 14a and 14b are formed on sample tables 18a and 18b which are rotated by sample table rotation mechanisms 19a and 19b, respectively. A bias voltage is applied between the tip end of the fine projection 13a or 13b formed at the end of the probe 11a or 11b and the reference scale 15a or 15b, by a bias power supply 21a or 21b, respectively. The tip ends of the fine projections 13a and 13b are close enough to the reference scales 15a and 15b to permit the flow of tunneling currents therebetween.

The tunneling currents 10a and 10b which flow from the fine projections 13a and 13b are applied to the signal processing circuits A and B, converted to voltages by a current-voltage converter 107 shown in FIG. 2, amplified by an amplifier 108 and converted by a logarithm converter 109.

The two probes 11a and 11b are vibrated by probe vibration means 110a and 110b (for example, PZT actuators) in the direction of the relative movement of the objects 101 and 102 at a frequency f and an amplitude d. A probe vibration signal is derived from a rectangular wave 2a having a frequency nf generated by an oscillator 111. It is converted to a triangular wave having a frequency f by a frequency divider 112 and waveform transformers 112a and 112b. It is amplified by an amplifier 114 (signal 2c) and applied to the probe vibration means 110a and 110b. Instead of vibrating the probes 11a and 11b, reference scale vibration means may be provided on the object 102 to vibrate the reference scales 15a and 15b.

In order to keep a mean distance between the probe and the reference scale at a constant level when the objects 101 and 102 are relatively moved laterally (in order to keep a mean tunneling current at a constant level), an output signal from the logarithm converter 109 is detected and a feedback loop is formed by a mean tunneling current setting circuit 115 which produces a difference between the output signal of the logarithm converter 109 and the set value, a low-pass filter 116 and an amplifier 117 so that the mean value of the detected tunneling current is equal to the set value. The distance between the probe and the reference scale is controlled by probe vertical displacement control means 17a or 17b (for example, PZT actuator). A cutoff frequency of the low-pass filter is selected such that it removes a fast modulation component of the tunneling current produced by the lateral vibration of the probe on the reference scale and passes a slow change of the tunneling current due to the skew of the reference scale when the objects 101 and 102 are relatively moved laterally.

A modulation component at the frequency f (2d/p, where p is a pitch of the reference scale) due to the scan of the probe on the reference scale appears in the tunneling current 10a or 10b which flows between the probe and the reference scale, by the vibration of the probe by the probe vibration means 110a or 110b. When the objects 101 and 102 are relatively moved laterally, the modulation components at the frequency f (2d/p) which appear in the tunneling currents 10a and 10b cause phase shifts with respect to the reference signal (for example, probe vibration signal). Since one period of the signal ($2\pi$ phase shift) corresponds to the relative lateral shift of one unit of the reference scale between the probe and the reference scale, the relative lateral displacement of the objects 101 and 102 can be detected by detecting the phase shift.

Figure 3:
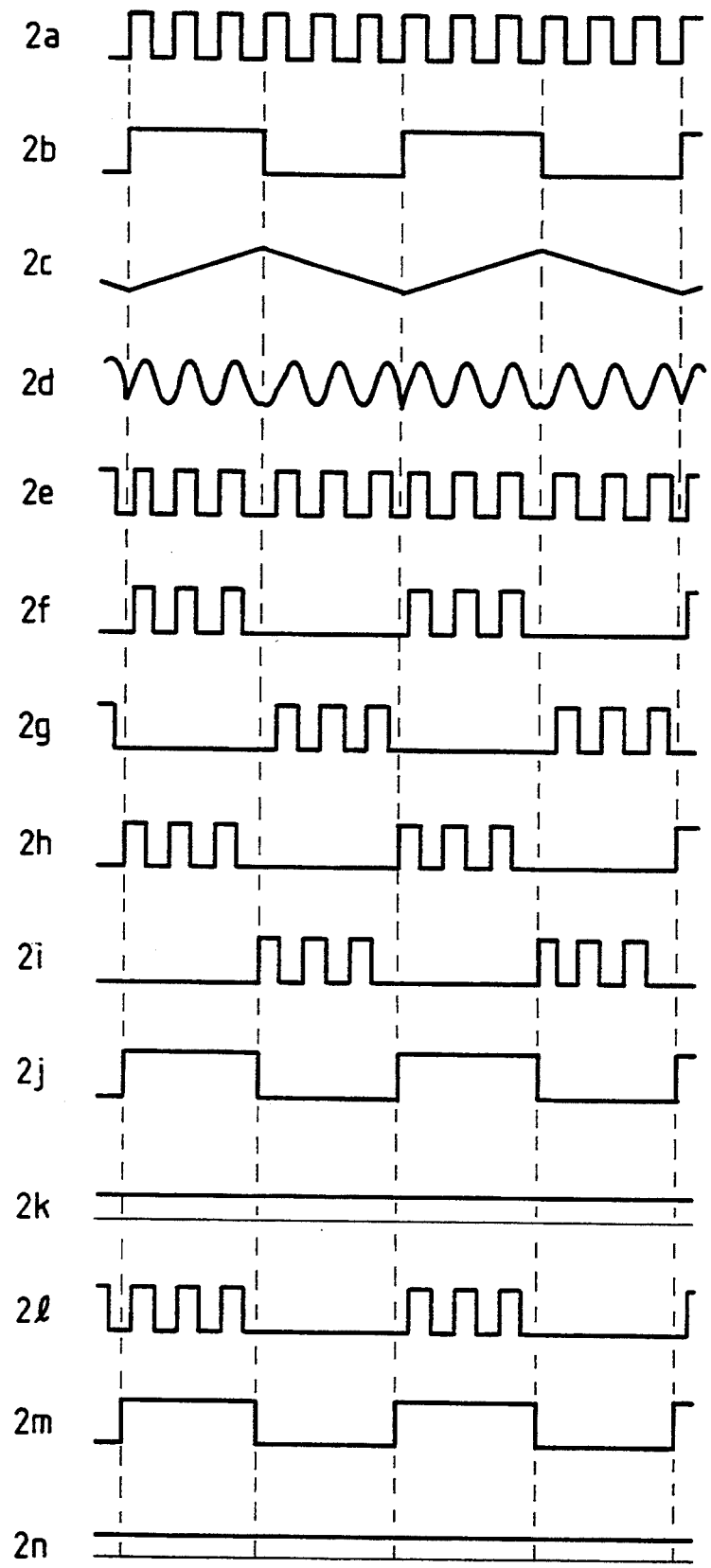
Figure 4:
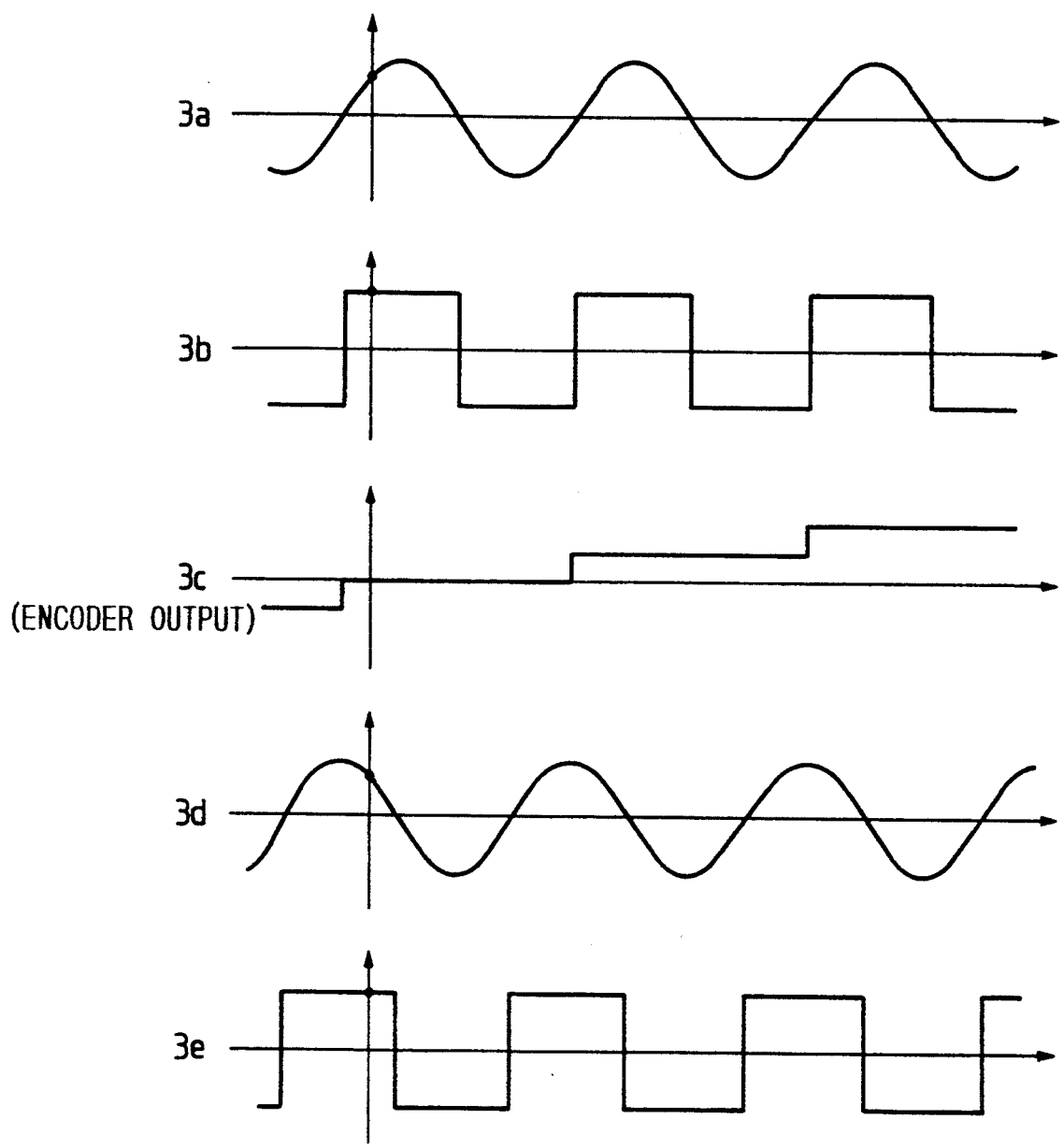

The operation of the signal processing circuit of FIG. 2 is explained with reference to FIGS. 3 and 4.

The modulation component at the frequency f (2d/p) which appears in the tunneling current is taken out through the current-voltage converter 107, the amplifier 108, the logarithm converter 109 and the band-pass filter 118 (see 2d), and it is binarized by a binarizing circuit 119 to produce a signal 2e. The amplitude (the gain of the amplifier 114) of the probe vibration signal 2c to be applied to the probe vibration means 110 (110a or 110b) is selected such that d=2p/n is met, and the frequency of the signal 2e is selected to be equal to nf. The signal 2a from the oscillator 111 is frequency-divided by the factor of n by the frequency divider 112 to produce a reference signal, and the signal 2e is separated into two signals 2f and 2g by an analog switch 120.

The signal 2a is separated into two signals 2h and 2i by an analog switch 121 by using the signal 2b as a reference signal.

The signals 2f and 2h are applied to a phase comparator 122, and a phase difference output signal 2j is averaged by an averaging circuit 123 to produce a signal 2k. Each time the phase difference reaches $2n\pi$ (where n is an integer), a zero-crossing point of the phase difference output signal 2k (3a) is detected by a binarizing circuit 124 to produce a pulse (signal 3b), and the pulse is counted by an up/down counter 125 so that a phase difference between the signal 2f and the signal 2h is detected.

A phase shift direction signal or an up/down condition (sign) to be applied to the counter 125 is determined in the following manner. The output signal 2a from the oscillator 111 is applied to a phase shifter 126 and an analog switch 127 to produce a signal 2l which has a 90° phase shift with respect to the signal 2h. The signal 2f and the signal 2l are applied to a phase comparator 128, and a phase difference output signal 2m is averaged by an averaging circuit 129 to produce a signal 2n (3d). The signal 3d is binarized by the binarizing circuits 120a and 120b to produce to phase shift direction signal or the up/down signal 3e to be applied to the up/down counter.

In this manner, the relative lateral displacement of the objects 101 and 102 is detected. The relative displacement signal 3c is produced from each of the signal processing circuits A and B as an encoder output a or b, respectively. When the two signals a and b are normal, the signal a is given a priority so that the measurement output is produced only based on the signal a. Alternatively, the measurement output may be produced based on a mean value of the signals a and b.

In the method of the present embodiment, one period ($2\pi$) of phase shift corresponds to one unit of reference scale (for example, lattice-to-lattice distance in an atom arrangement of a crystal lattice), of the relative movement. While it was not explained in the present embodiment, the signals 2g and 2i may processed in the same manner to detect the relative movement.

Figure 5:
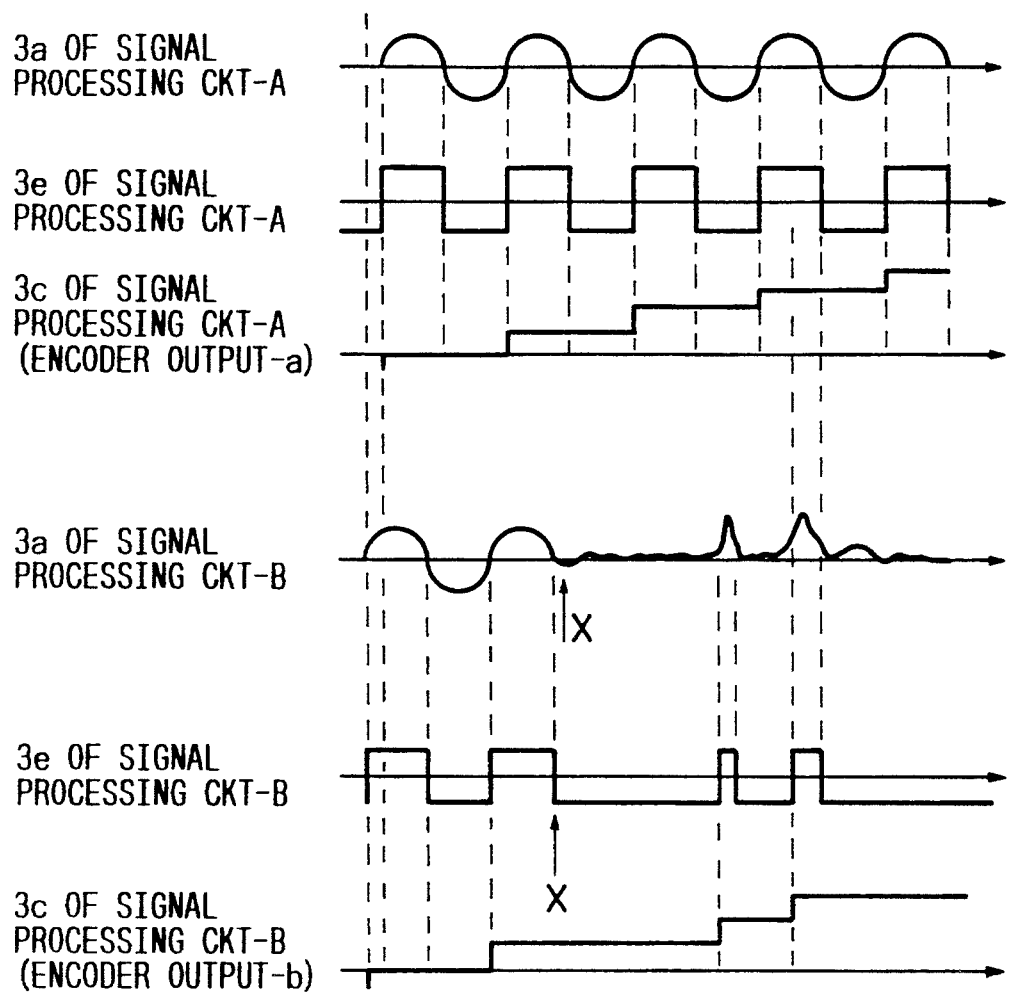

The signals of the encoder outputs a and b of FIG. 1 are compared. FIG. 5 shows waveforms of signals 3a, 3e and 3c in the signal processing circuits A and B. The reference scales of the same material and the same scale pitch are used for reference scales 15a and 15b formed to face the fine projections 13a and 13b. Accordingly, the encoder outputs a and b are to be the same waveform but the comparison of both waveforms indicates the appearance of non-periodicity in the signals at a position X in the signal processing circuit B, as shown in FIG. 5. This means that, at the position X of the signal processing circuit B, the tip end of the fine projection 13b has become improper as the probe for the encoder of the present embodiment which has the atom resolution power, by the influence of the break by the contact.

The performance of the probe is determined by a probe performance test circuit 200 of FIG. 2. In the test circuit, a change in the tunneling current detected by the probe 104 is converted to an electrical signal by the current-voltage converter 107, the amplifier 108 and the logarithm converter 109, and the modulation component at the frequency $f_1$ (2d/p) on the output signal of the logarithm converter 109 is taken out by a band-pass filter 201. It is rectified by a full-wave rectification circuit 202, averaged by an integration circuit 203, and the average signal is compared with a signal which is produced by a reference power supply 205 and is a reference to a preset probe performance (that is, a signal which is set to an average value of the modulation component which is constant when the needle is normal), by a comparator 204. When the needle is broken, the detection signal including the modulation component is zero or very weak and the average value of the modulation component is smaller than the reference signal. This change is detected by the comparator to determine the performance of the probe and produce the test output. The break of the tip end of the fine projection 13 (13a, 13b) can be determined based on the test output.

FIG. 7 shows a block diagram of a sequence control circuit for controlling various elements in accordance with the break information, and a flow of signals in the periphery of the control circuit. In FIG. 7, numeral 301 denotes a sequence control circuit, and numeral 304 denotes an analog switch for selecting one of encoder outputs a and b of the signal processing circuits A and B. The sequence control circuit 301 reads in the test outputs from the signal processing circuits and selects the encoder output a by the switch 304 when there is no break in any of the projections or there is break in the projection 13b, and selects the encoder output b when there is break in the projection 13a. The sequence control circuit 301 also generates command signals to control other elements shown in FIG. 7.

The measurement of distance is carried out between the fine projection 13a and the reference scale 15a without interruption even if there is a break in the fine projection 13b, but since the tip end of the probe 11a may be broken some time, it is necessary to reproduce or repair the broken fine projection 13b.

Figure 8:
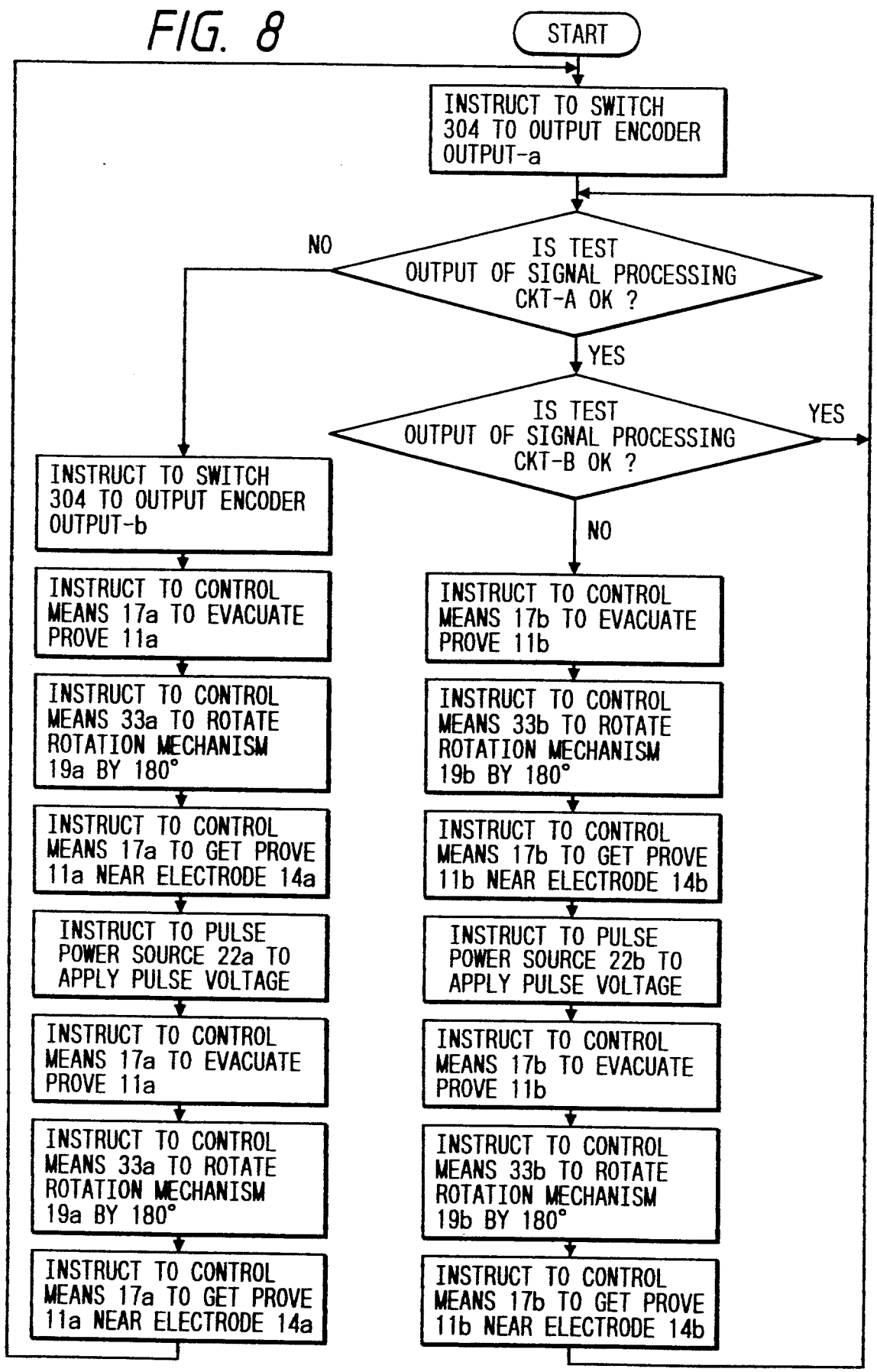
FIG. 8 shows a control flow chart of the sequence control circuit.

The operation of reproduction (controlled by the sequence control circuit 301) is now explained. In the present embodiment, since it is assumed that the tip end of the fine projection 13b is broken, a reproducing mechanism on the left side of FIG. 1 is used. The encoder mechanism on the right side of FIG. 1 continues the measurement of distance. Alternatively, it may temporarily stop the measurement of distance. Since the fine projection 13b is very close to the reference scale 15b to permit the flow of the tunneling current, the probe 11b is retracted from the reference scale 15b by the probe vertical position control means 17b. The sample table 16b on which the reference scale 15b and the probe reproducing electrode 14b are mounted is rotated by 180° by the sample table rotation mechanism 19b and the rotation mechanism position control means 33b so that the probe reproducing electrode 14b faces the fine projection 13b. The probe 11b having the fine projection 13b at the tip and retracted is approached to the distance which permits the flow of the tunneling current in the probe reproducing electrode 14b. A pulse voltage is applied from the pulse power supply 22b between the fine projection 13b and the electrode 14b to permit the reproduction of the fine projection 13b. After the reproduction of the fine projection, the fine projection 13b is retracted and the reference scale 15b is brought to face the fine projection 13b, and fine projection 13b is approached to the reference scale 15b to permit the flow of tunneling current in the reference scale 15b. In this manner, the broken end of the probe can be reproduced. When the fine projection 13a is broken, the switch 304 is selected so that the projection 13a is processed in the same manner. A control flow chart of the sequence control circuit 301 is shown in FIG. 8.

In accordance with the present embodiment, the broken probe can be reproduced, and the other probe continues the measurement of distance while the broken probe is reproduced. Accordingly, the measurement of distance is done exactly and the reliability of the encoder is improved.

Figure 6A:
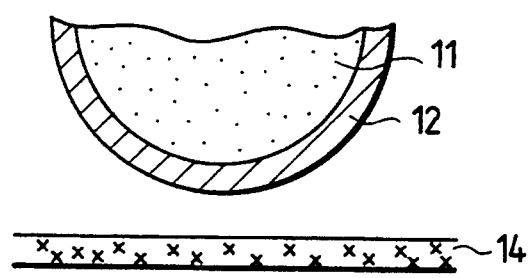
FIGS. 6A and 6B show a basic principle of forming a probe in the embodiment.
Figure 6B:
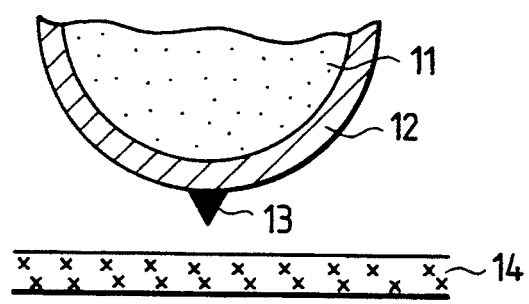

The method for forming the fine projection 13 (13a or 13b) used in the present embodiment is now explained in detail with reference to FIGS. 1 and 6.

The material of the probe reproducing electrode 14 (14a or 14b) of the present invention is a platinum evaporated film. The platinum film was evaporated on a corning 7059 glass substrate by an ion beam sputtering apparatus. The material of the probe 11 (11a or 11b) is tangusten. In order to sharpen the tungsten probe, a conventional electrolytic polishing method was used. A radius of curvature at the tip end of the probe 11 manufactured by the electrolytic polishing was approximately 0.1 $\mu$m. Gold was deposited to a thickness of 15 nm on the tip end of the probe 11 by using the ion beam sputtering apparatus. The distance between the tip end of the probe 11 and the probe reproducing electrode 14 was close enough to permit the flow of the tunneling current. Pulses each having a pulse width of 4 $\mu$s and a pulse height of 4 volts were applied from the pulse power supplies 22a and 22b to the probe 11 and the probe reproducing electrode 14 to form the fine projection 13 (13a, 13b) shown in FIG. 6b. The size and shape of the formed fine projection 13 were of conical shape having a height of 10 nm and a bottom area of 15 nm$^2$. A mechanism of the formation of the fine projection would be that the material is instantly and locally molten by the application of the high voltage pulse, and the molten material is tensioned between the probe and the sample because of the electric field applied between the probe and the sample so that the projection is formed. The material of the probe, the material of the coating of the probe and the material of the probe reproducing electrode are not limited to those described above but they may be appropriately selected. It is preferable that the material of the probe has a lower melting point than that of the material of the probe reproducing electrode.

In the present embodiment, particular pulse height and pulse width are used to reproduce the probe, although proper values may be selected depending on the material of the probe and the material of the probe reproducing electrode.

The encoder of the present invention enables the multiple encoding so that when one tunneling current detection probe is broken during the encoding and cannot encode correctly, the encoding by another tunneling current detection probe is continued. Thus, the long time encoding can be effected in a stable manner. Accordingly, an encoder which is stable over a longer period than the prior art encoder is provided.

We claim:

1. An apparatus for detecting information from an information bearing medium, comprising:
   a plurality of probes arranged to face the medium, each of said probes producing a detection signal from the medium;
   performance test means for testing a signal producing condition of each of said probes; and
   detection means for selecting a detection signal from at least one of the probes having a predetermined signal producing condition based on a test by said performance test means and detecting the information in response to the selected detection signal.

2. An apparatus for detecting information from an information bearing medium according to claim 1, wherein said probes are arranged to face scale means of the medium for imparting information on a length of the medium, and said detection means detects relative displacement information of said probes with respect to said scale means as said information.

3. An apparatus for detecting information from an information bearing medium according to claim 2, wherein said probes are arranged to face a plurality of identical scale means formed for respective probes.

4. An apparatus for detecting information from an information bearing medium according to claim 1, wherein said performance test means tests the signal producing condition of respective ones of the plurality of probes based on the signals produced from the respective ones of the plurality of probes.

5. An apparatus for detecting information form an information bearing medium according to claim 1, wherein said probes produce signals due to tunneling currents flowing between said probes and the medium as the detection signals.

6. An apparatus for detecting information from an information bearing medium according to claim 1, wherein said detection means detects the information in response to a signal from the at least one of said probes having the predetermined signal producing condition when a physical defect is detected in one of said probes by said performance test means.

7. An apparatus for detecting information from an information bearing medium according to claim 1, wherein said detection means detects the information in response to a signal from a predetermined one of said probes when a physical defect is not detected in any of said probes by said performance test means.

8. An apparatus for detecting information from an information bearing medium according to claim 1, wherein said detection means detects the information in response to a mean value of the signals produced by said probes when a physical defect is not detected in any of said probes by said performance test means.

9. An apparatus for detecting information from an information bearing medium according to claim 1, further comprising repairing means for repairing a probe having a physical defect detected by said performance test means.

10. An apparatus for detecting information from an information bearing medium according to claim 9, wherein said repairing means includes position control means for bringing the probe having the physical defect detected to face a probe reproducing station and reproducing means for repairing the probe brought to face the probe reproducing station, and said position control means controls the position of the probe repaired by said reproducing means to face the medium.

11. An apparatus for detecting displacement information between two objects based on information from a scale imparting a positional reference, comprising:
   a plurality of probes formed on one of said two objects other than an object having scales formed thereon, said probes being arranged to face respective scales and said probes producing detection signals from the scales;
   a performance test circuit for testing a signal producing condition of said probes; and
   a signal processing circuit for selecting a detection signal from at least one of said probes having a predetermined signal producing condition based on the test by said performance test circuit and detecting the displacement information of the two objects in response to the selected detection signal.

12. An apparatus for detecting displacement information between two objects according to claim 11, wherein said performance test circuit tests the signal producing condition of respective ones of the plurality of probes based on signals produced from the respective ones of the plurality of probes.

13. An apparatus for detecting displacement information between two objects according to claim 11, wherein said probes produce signals due to tunneling currents flowing between said and a medium as the detection signals.

14. An apparatus for detecting displacement information between two objects according to claim 11, further comprising an actuator for vibrating said probes laterally with respect to the scales;
   said performance test circuit testing the signal producing condition of said probes based on the signals from said probes vibrated by said actuator.

15. An apparatus for detecting displacement information between two objects according to claim 11, further comprising an actuator for vibrating said probes laterally with respect to the scales;
   said signal processing circuit detecting the displacement information of the two objects based on a signal produced by a probe having the predetermined signal produced condition vibrated by said actuator.

16. An apparatus for detecting displacement information between two objects according to claim 11, wherein said signal processing circuit detects the displacement information of the two objects in response to a signal from a probe having the predetermined signal producing condition when a physical defect is detected in one of the probes by said performance test circuit.

17. An apparatus for detecting displacement information between two objects according to claim 11, wherein said signal processing circuit detects the displacement information of the two objects in accordance with a signal from a predetermined one of said probes when a physical defect is not detected in any of said probes by said performance test circuit.

18. An apparatus for detecting displacement information between two objects according to claim 11, wherein said signal processing circuit detects the displacement information of the two objects in response to a mean value of the signals produced by said probes when a physical defect is not detected in any of said probes by said performance test circuit.

19. An apparatus for detecting displacement information between two objects according to claim 11, further comprising a repairing mechanism for repairing a probe having a physical defect detected by said performance test circuit.

20. A method for detecting information from an information bearing medium, comprising the steps of:
   arranging a plurality of probes to face the medium;
   detecting signals from the medium by the probes;
   testing a signal producing condition of each probe;
   selecting a detected medium signal from at least one of the probes having a predetermined signal producing condition based on the testing of the signal producing condition of the probes; and
   detecting the information in response to the selected detected medium signal.

21. A method for detecting information from an information bearing medium according to claim 20, wherein
   the step of arranging the plurality of probes includes arranging the plurality of probes to face scale means of the medium to impart information on length of the medium, and
   the step of detecting information includes detecting relative displacement information of the probes with respect to the scale.

22. A method for detecting information from an information bearing medium according to claim 20, further comprising the step of repairing a probe having a physical defect based on the testing of the signal producing condition of the probes.

23. An apparatus for transferring information between a medium and a probe, comprising:

performance test means for testing a signal producing condition of a plurality of probes arranged to face the medium; and transfer means for selecting at least one of the probes having a predetermined signal producing condition based on the test by said performance test means and transferring the information int he medium with the selected probe.

24. An apparatus for transferring information between a medium and a probe according to claim 23, wherein said transfer means detects information on a length from the medium by the at least one of said probes having the predetermined signal producing condition.

25. An apparatus for transferring information between a medium and a probe according to claim 23, further comprising means for repairing a probe having a physical defect based on the test by said performance test means.

* * * * *

UNITED STATES PATENT AND TRADEMARK OFFICE
CERTIFICATE OF CORRECTION

PATENT NO. : 5,349,735

DATED : September 27, 1994

INVENTOR : TOSHIMITSU KAWASE

It is certified that error appears in the above-identified patent and that said Letters Patent is hereby corrected as shown below:

ON THE TITLE PAGE

Under [57] "ABSTRACT"

"such the" should read --such--.

SHEET 7 OF 8

FIG. 7, "PROVE" should read --PROBE--. (both occurrences)

SHEET 8 OF 8

FIG. 8, "PROVE" should read --PROBE--. (both occurrences)

COLUMN 5

Line 34, "and" should read --end--.
Line 65, ""tangusten." should read --tungsten--.

UNITED STATES PATENT AND TRADEMARK OFFICE
CERTIFICATE OF CORRECTION

PATENT NO. : 5,349,735

DATED : September 27, 1994

INVENTOR : TOSHIMITSU KAWASE

It is certified that error appears in the above-identified patent and that said Letters Patent is hereby corrected as shown below:

COLUMN 7

Line 1, "form" should read --from--.
Line 65, "said" should read --said probes--.

COLUMN 9

Line 7, "int he" should read --in the--.

Signed and Sealed this

Eighteenth Day of April, 1995

Attest:

BRUCE LEHMAN

Attesting Officer

Commissioner of Patents and Trademarks